United States Patent [19]
Lee

[11] Patent Number: 5,850,337
[45] Date of Patent: Dec. 15, 1998

[54] MAGNETIC-FREE DC/DC CONVERTER AND METHOD OF OPERATION THEREOF

[75] Inventor: Victor Ke-Ji Lee, Plano, Tex.

[73] Assignee: Lucent Technologies Inc., Murray Hill, N.J.

[21] Appl. No.: 900,553

[22] Filed: Jul. 25, 1997

[51] Int. Cl.⁶ .................................................. H02M 3/06
[52] U.S. Cl. ............................................. 363/62; 323/223
[58] Field of Search ................................... 323/220, 223, 323/284; 363/62; 307/109

[56] References Cited

U.S. PATENT DOCUMENTS

| | | | |
|---|---|---|---|
| 4,205,369 | 5/1980 | Asano | 363/62 |
| 4,961,220 | 10/1990 | Tentler et al. | 323/223 |
| 5,394,077 | 2/1995 | Atsumi | 323/223 |
| 5,506,493 | 4/1996 | Stengel | 323/223 |
| 5,521,488 | 5/1996 | Stockstad et al. | 323/284 |
| 5,546,297 | 8/1996 | Duley | 363/62 |

OTHER PUBLICATIONS

Article entitled "Chaos From Switched–Capacitor Circuits: Discrete Maps" by Angel Rodriguez–Vazquez, Jose L. Huertas, Adoracion Rueda, Belen Perez–Verdu and Leon O. Chua; from Proceedings of the IEEE, vol. 75, No. 8, 1987 pp. 1090–1097.

Article entitled "A DC–DC Converter for Short–Channel CMOS Technologies" by Scott K. Reynolds; from IEEE Journal of Solid–State Circuits, vol. 32, No. 1, Jan. 1997, pp. 111–113.

Article entitled "Switched Capacitor Voltage Converter" by Dennis O'Neill and Ross Nimmo; from Electronic Engineering, Jun. 1987, pp. 85–89.

*Primary Examiner*—Stuart N. Hecker

[57] ABSTRACT

Magnetic-free DC/DC converters, methods of operation thereof and a computer system employing at least one converter. In one embodiment, the converter includes: (1) an input capacitor coupled to a DC input of the converter, (2) a first switch coupled between the input capacitor and an output of the converter to transfer electrical power from the DC input to the output when the first switch is closed, (3) an output capacitor coupled in parallel with the output of the converter, (4) a second switch coupled in parallel with the input capacitor to short the input capacitor when the second switch is closed and (5) a switching controller circuit, coupled to the first and second switches, that provides complementary control signals to the first and second switches that are a function of an output voltage of the converter.

20 Claims, 3 Drawing Sheets

5,850,337

1

MAGNETIC-FREE DC/DC CONVERTER AND METHOD OF OPERATION THEREOF

TECHNICAL FIELD OF THE INVENTION

The present invention is directed, in general, to power conversion and, more specifically, to a magnetic-free DC/DC converter and a method of operation of the converter.

BACKGROUND OF THE INVENTION

Regulated DC power supplies are employed in various analog and digital electronic systems. The power supplies are typically designed to produce a regulated output (i.e., the output voltage is maintained within a specific range) with electrical isolation between the input and output. Additionally, power supplies may also be designed to provide multiple outputs (e.g., positive and negative) that differ in voltage and current ratings. Two conventional topologies used in DC power supplies are a linear design topology and a switching design topology.

In the linear design topology, a low-frequency (e.g., 60 Hertz) transformer is used to provide electrical isolation between the input and output with a transistor acting as an adjustable resistor. While the linear power supply employs a simple design and introduces a moderate electromagnetic interference (EMI) with other equipment employed therewith, the topology endures several limitations. First, the low-frequency transformers are relatively large and, as a result, the dimensions of the linear power supply are constrained to accommodate the large low-frequency transformer. Due to the size limitations, the linear power supply is not preferable, especially, in environments where the components are being downsized. Additionally, the transistor, acting as an adjustable resistor, almost exclusively operates in its active region thereby resulting in a significant amount of power loss. Typically, the overall efficiencies of the linear power supplies are between 30% and 60%.

In contrast to the linear power supplies, the transformation of the DC voltage in the switching power supplies is accomplished using DC/DC converters. The DC/DC converters usually employ solid-state devices (e.g., transistors) as switching devices that are either completely on or completely off. Since the devices do not operate in the active region, power dissipation therethrough is significantly reduced resulting in a higher efficiency converter (typically, 70% to 90% efficient). Additionally, since the switching power supplies employ a high frequency isolation transformer, the size and weight of the switching power supplies may be significantly reduced.

In many applications, the voltage of the power supply rails of the electronic equipment exceeds the power requirements of the components employed therein. For instance, the optimum input voltages for short channel (e.g., $L_{eff} < 0.2 \mu m$) complementary metal oxide semiconductor (CMOS) devices is less than 2 volts and the power supply rails on board-level systems is 3.3 volts. In such cases, a switched-mode DC/DC power converter is often employed to convert the voltage of the supply rails to the appropriate voltage of the individual components. Switched-mode DC/DC power converters generally include magnetic devices (e.g., inductors and transformers) that serve as a bridge for energy transfer in the converter. Presently, the magnetic devices cannot be integrated with other circuits and, as a result, are discrete components within the converter. While raising the switching frequencies of the converter may reduce the size of the magnetic devices, a discrete magnetic device is still necessary to achieve the energy storage and transfer function within the converter. For instance, in specific applications (e.g., smart power integrated circuits) where the control and switching devices (e.g., transistors and diodes) are integrated into an integrated circuit (IC), the magnetic devices remain discrete due to their size.

Accordingly, what is a need in the art is an improved power converter and method that overcomes the limitations of the prior art.

SUMMARY OF THE INVENTION

To address the above-discussed deficiencies of the prior art, the present invention provides magnetic-free DC/DC converters, methods of operation thereof and a computer system employing at least one converter. In one embodiment, the converter includes: (1) an input capacitor coupled to a DC input of the converter, (2) a first switch coupled between the input capacitor and an output of the converter to transfer electrical power from the DC input to the output when the first switch is closed, (3) an output capacitor coupled in parallel with the output of the converter, (4) a second switch coupled in parallel with the input capacitor to short the input capacitor when the second switch is closed and (5) a switching controller circuit, coupled to the first and second switches, that provides complementary control signals to the first and second switches that are a function of an output voltage of the converter.

The present invention therefore introduces a power converter that relies on capacitors for the transfer of energy within the converter rather than on magnetic components, such as transformers and inductors. Such magnetic-free converters may be advantageously embodied in monolithic integrated circuits.

In one embodiment of the present invention, the converter further comprises a voltage sensing circuit including a resistor divider network coupled in parallel with the output. The switching controller circuit senses a voltage at a node in the resistor divider network that is a function of the output voltage of the converter. Alternatively, the voltage sensing circuit may directly sense the output voltage of the converter.

In one embodiment of the present invention, the switching controller circuit comprises a flip-flop that provides the complementary control signals to the first and second switches. In an embodiment to be illustrated, the flip-flop is a DQ flip-flop.

In one embodiment of the present invention, the converter further comprises an inrush resistor, coupled between the input of the converter and the input capacitor, that limits a charge rate of the input capacitor. The inrush resistor, which is not necessary to the present invention, may be sized to meter the flow of input current to the input capacitor.

In one embodiment of the present invention, the output voltage is maintained at a single DC level. Alternatively, the output voltage may be made to vary.

In one embodiment of the present invention, the output voltage is selected from the group consisting of: (1) +5 volts and (2) +3.3 volts. Such voltages are commonly found in computer systems. Other voltages are certainly within the broad scope of the present invention.

In one embodiment of the present invention, the input and output capacitor, the first and second switches and the switching controller circuit are embodied in a monolithic integrated circuit. Alternatively, the present invention may be embodied as a circuit of discrete components.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
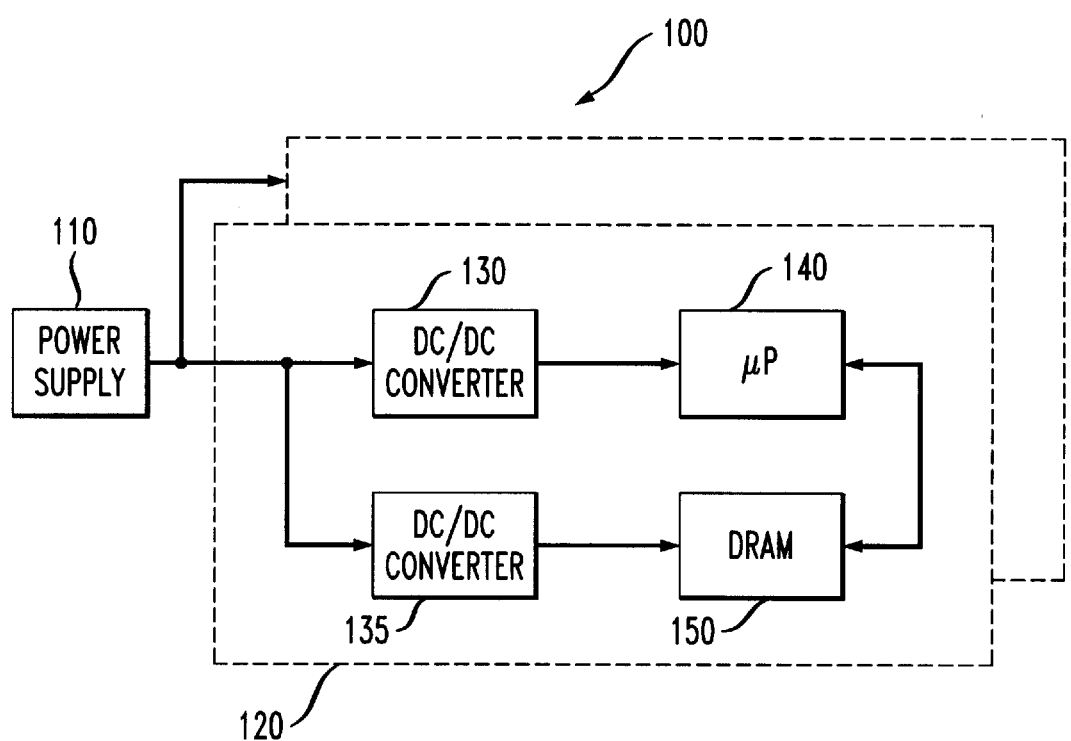
FIG. 1 illustrates a computer system that contains embodiments of multiple magnetic-free DC/DC converters constructed according to the present invention.

Referring initially to FIG. 1, illustrated is a computer system 100 that contains embodiments of multiple magnetic-free DC/DC converters 130, 135 according to the present invention. The computer system 100 includes a power supply 110 that is typically coupled to a plurality of circuit boards (one of which is designated 120). The exemplary circuit board 120 includes the magnetic-free DC/DC converters 130, 135 that are individually coupled to a microprocessor 140 and dynamic random access memory (DRAM) 150, respectively. The magnetic-free DC/DC converters 130, 135 may be localized (i.e., integrated on the same chip with the component it supports) for applications requiring the energy source next to the component, for example high-speed circuits, or the converters may reside separately on a single chip. The present invention does not limit the magnetic-free DC/DC converters 130, 135 to reside in any specific location.

The power supply 110 generates a DC output voltage level that may be multiple DC output voltage levels (e.g., +3.3 or +5 volts). The power supply 110 output voltage is supplied by a power bus or other suitable mechanism to each of the circuit boards 120. The circuit boards may include, for instance, a motherboard (in a personal computer), "plug-in" dynamic DRAM chips, communication card(s) or video card(s). The magnetic-free DC/DC converters 130, 135 convert the output voltage from the power supply 110 to the voltage level requirements of the components or devices that the magnetic-free DC/DC converters 130, 135 support. The magnetic-free DC/DC converters 130, 135 are readily configured to provide the input voltage requirements of the component or device that it supports.

Figure 2:
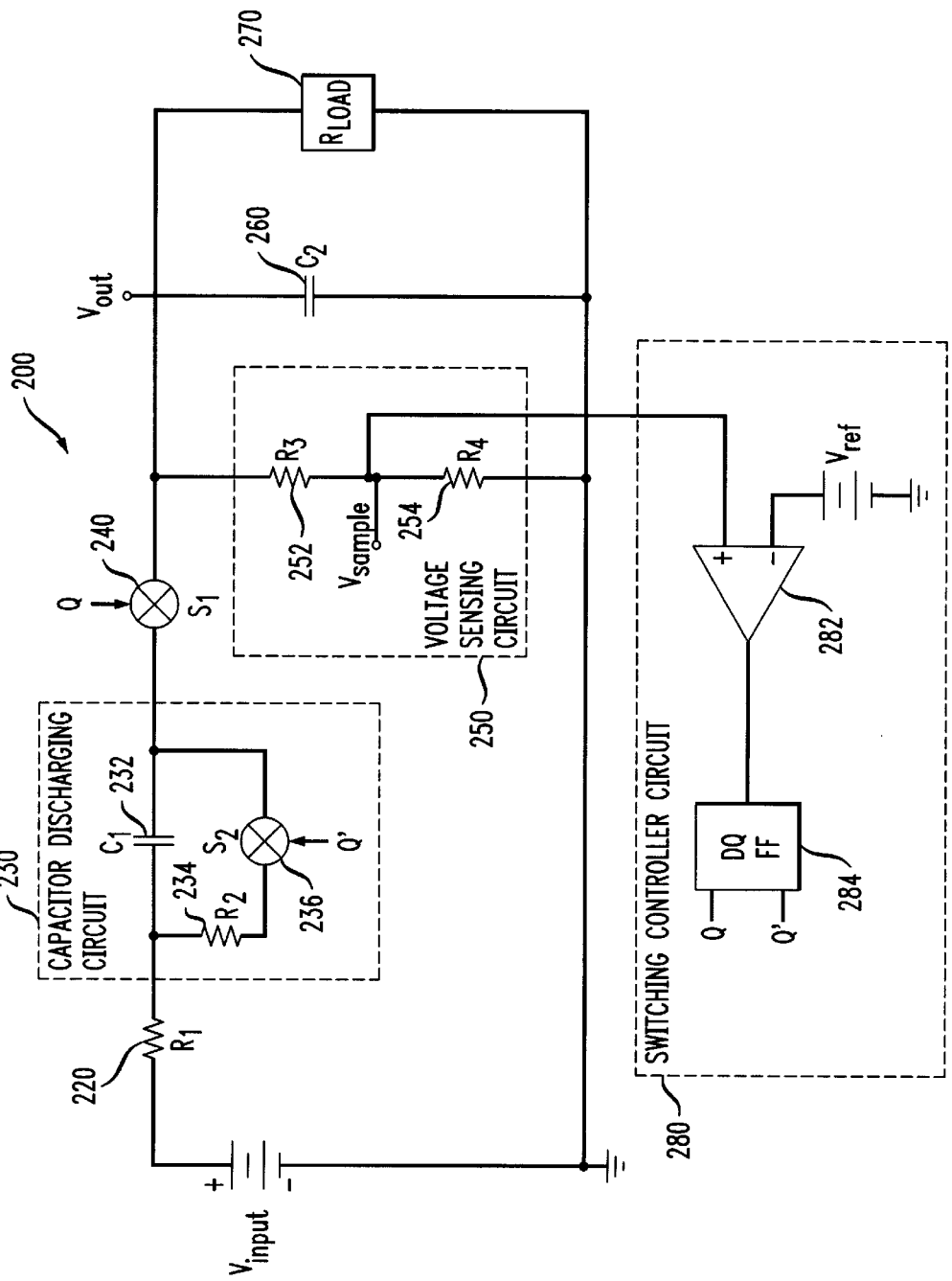
FIG. 2 illustrates a schematic diagram of an embodiment of the magnetic-free DC/DC converter of the present invention.

Turning now to FIG. 2, illustrated is a schematic diagram of an embodiment of a magnetic-free DC/DC converter 200 of the present invention. The magnetic-free DC/DC converter 200 includes an input DC voltage source 210 coupled to an inrush resistor 220. A capacitor discharging circuit 230 is coupled in series with the inrush resistor 220 and a first switch 240. The inrush resistor 220 reduces the current entering the capacitor discharging circuit 230 when the first switch 240 is initially closed. A transistor is typically used for the first switch 240. Of course, those skilled in the art should be familiar with other devices and switching design methodologies. The first switch 240 is also coupled to a load 270. A voltage sensing circuit 250 is coupled in parallel with the load 270 and to an output capacitor 260. A switching controller circuit 280 is coupled to the capacitor discharging circuit 230, the first switch 240 and the voltage sensing circuit 250.

The exemplary capacitor discharging circuit 230 includes an input capacitor 232 connected in series with a discharge resistor 234 and a second switch 236. The capacitor discharging circuit 230 allows the voltage across the input capacitor 232 to discharge by providing a current path when the second switch 236, typically a transistor, is ON (i.e., conducting). Those skilled in the art should be familiar with techniques for discharging capacitors. The voltage sensing circuit 250 includes a first and second resistor 252, 254 connected in series and a sample voltage $V_{sample}$ measured across second resistor 254 is described by the following equation:

$$V_{sample} = (R_4 \cdot V_{out})/(R_3 + R_4) \qquad (1)$$

The first and second resistors 252, 254 form a resistor divider network that allows adjustment, by varying the values of the first and second resistors 252, 254, of the output voltage $V_{out}$ to a desired value. The sample voltage $V_{sample}$ is provided to the switching controller circuit 280 thereby comparing the sample voltage $V_{sample}$ with a reference voltage $V_{ref}$ to determine the settings of the first and second switches 236, 240. The switching controller circuit 280 includes an operational amplifier 282 that is coupled to a DQ flip-flop 284. The operational amplifier 282 is configured as a comparator with the reference voltage $V_{ref}$ connected to the inverting input and the non-inverting input connected to the sample voltage $V_{sample}$. The bistable output of the DQ flip-flop 284 provides a complementary switching arrangement with the first and second switches 236, 240.

Figure 3:
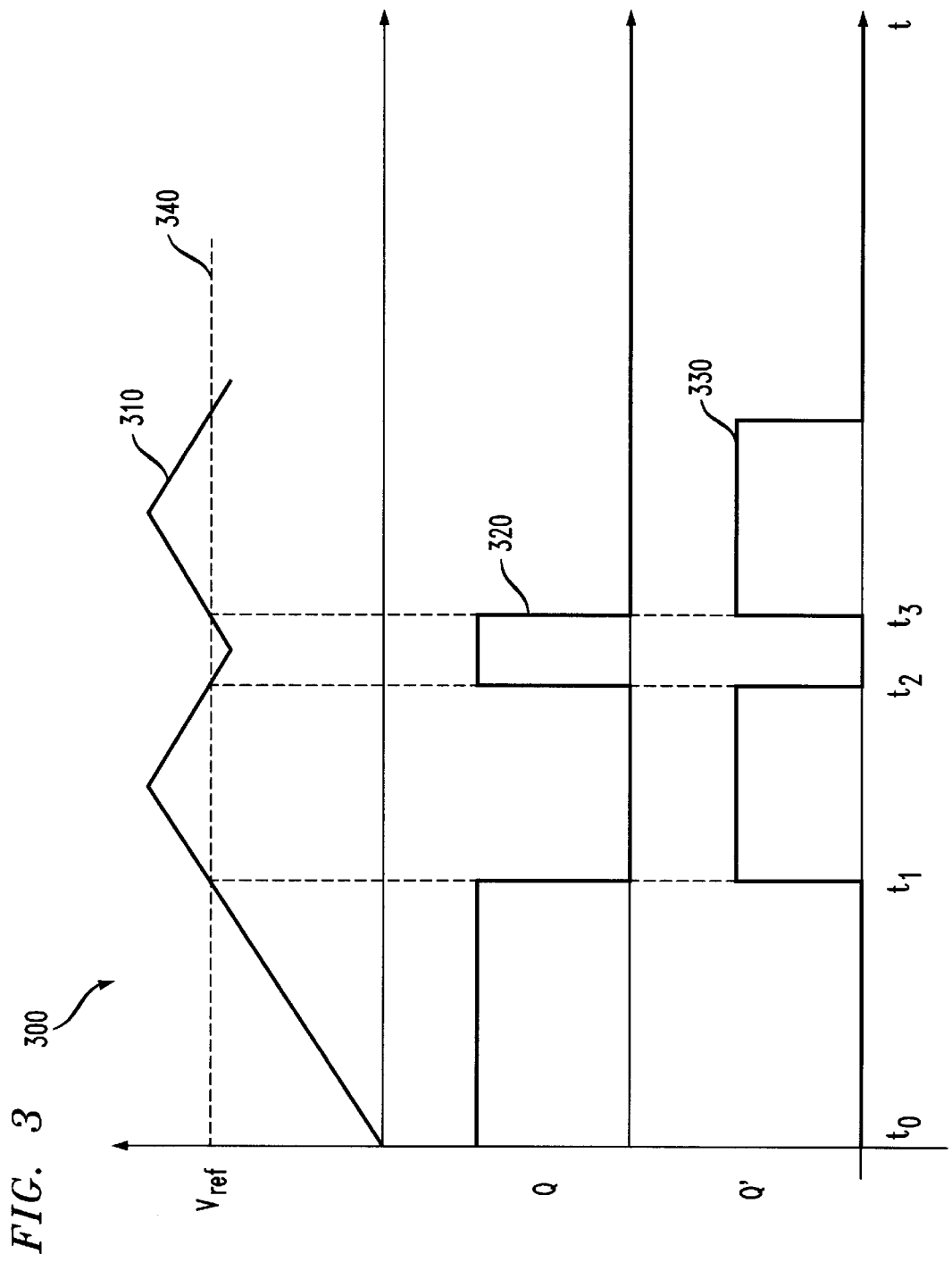
FIG. 3 illustrates a timing diagram that depicts selected voltage and pulses during the operation of the magnetic-free DC/DC converter of FIG. 2.

Turning now to FIG. 3, illustrated is a timing diagram that depicts selected voltage and pulses during the operation of the magnetic-free DC/DC converter 200 of FIG. 2. The basic operation of the magnetic-free DC/DC converter 200 will hereinafter be described. It should be noted that the relative sizes of the separations between periods $t_0$, $t_1$, $t_2$ and $t_3$ are drawn for clarity and ease of explanation and are not necessarily to scale.

The voltage waveform 310 illustrates the sample voltage $V_{sample}$, the voltage across the second resistor 254, and a dashed line 340 depicts the reference voltage $V_{ref}$. A first and second switching control pulse waveforms 320, 330 demonstrated the control pulses for the first and second switches 240, 236 respectively. At a first time $t_0$, the output capacitor 260 is completely discharged (i.e., $V_{out}=0$ Volts) and the sample voltage $V_{sample}$ is also at zero volts. With the voltage at the noninverting input of the operational amplifier 282 at zero volts, a value lower than the reference voltage $V_{ref}$ (indicative of the output of the operational amplifier 282) causes the DQ flip-flop 284 to set (i.e., Q=1 and Q'=0) as illustrated by the first and second switching control pulse waveforms 320, 330. With the preceding conditions, the second switch 236 is not conducting (i.e., OFF) and the first switch 240 is ON. Those skilled in the art should appreciate that because of propagation delays inherent in the circuit, the first and second switches 236, 240, the operational amplifier 282 and the DQ flip-flop 284 do not change "state" instantaneously when the sample voltage $V_{sample}$ is greater or lower than the reference voltage $V_{ref}$ thereby resulting in the "ripple" in the voltage waveform 310. The magnitude of the ripple in the output voltage $V_{out}$ is dependent on the length of the propagation delays (i.e., the longer the propagation delays, the larger the magnitude of the ripple).

Between the first time period $t_0$ and a second time period $t_1$, the output capacitor 260 is charged through the inrush resistor 220 to the design output voltage $V_{out}$ and, at the second time period $t_1$, the sample voltage $V_{sample}$ is equal to the reference voltage $V_{ref}$. Assuming the voltage drops across the inrush resistor 220 and first switch 240 are negligible, the input capacitor 232 is also charged and the voltage across the input capacitor 232 is equal to the difference between the input and output voltage ($V_{in}$31 $V_{out}$). After the second time period $t_1$ (when $V_{sample} > V_{ref}$), the output of the operational amplifier 282 changes state causing the DQ flip-flop 284 to reset (i.e., Q=0 and Q'=1). With the new control signals Q, Q', the first and second switches 236, 240 are reconfigured with the first switch 240 OFF and the second switch 236 ON. Between the second time period $t_1$ and a third time period $t_2$, the output capacitor 260 discharges through the load resistor 270 and through the first and second resistors 252, 254 of the voltage sensing circuit 250. Also, during this period, with the second switch 240 ON, the input capacitor 232 is also discharging through the discharge resistor 234. Those skilled in the art should understand the necessity of discharging the input capacitor 232. If the voltage across the input capacitor 232 remains at the difference between the input and output voltage ($V_{in} - V_{out}$) when the first switch 240 is closed, the output voltage $V_{out}$ never attains the desired steady-state value. The voltage across the input capacitor 232, after the closing of the first switch 240, is increased from the difference between the input and output voltage ($V_{in} - V_{Out}$) and this prevents the voltage across the output capacitor 260 from reaching a steady-state condition at the desired output voltage $V_{out}$. For the output voltage $V_{out}$ to reach a steady-state condition, the voltage across the input capacitor 232 should be below the difference between the input and output voltage ($V_{in-Vout}$) when the first switch 240 is closed. At the third time period $t_2$, the sample voltage $V_{sample}$ has fallen to the reference value $V_{ref}$ and the output of the operational amplifier 282 again changes when the sample voltage $V_{sample}$ is less than the reference value $V_{ref}$ ($V_{sample} < V_{ref}$) causing the DQ flip-flop 284 to switch states (i.e., Q=1 and Q'=0). The output capacitor 260 is again charged to the designed output voltage $V_{out}$ at the fourth time period $t_3$. The cycle of charging output capacitor 260 and discharging input capacitor 232 continues for the duration operation of the magnetic-free DC/DC converter 200.

For a better understanding of power electronics and switched-mode converters see *Switching Power Supply Design*, Abraham Pressman, McGraw Hill (1991), which is herein incorporated by reference.

Although the present invention has been described in detail, those skilled in the art should understand that they can make various changes, substitutions and alterations herein without departing from the spirit and scope of the invention in its broadest form.

What is claimed is:

1. A magnetic-free DC/DC converter, comprising:
   an input capacitor coupled to a DC input of said converter;
   a first switch coupled between said input capacitor and an output of said converter to transfer electrical power from said DC input to said output when said first switch is closed;
   an output capacitor coupled in parallel with said output of said converter;
   a second switch coupled in parallel with said input capacitor to short said input capacitor when said second switch is closed; and
   a switching controller circuit, coupled to said first and second switches, that provides complementary control signals to said first and second switches that are a function of an output voltage of said converter.

2. The converter as recited in claim 1 further comprising a voltage sensing circuit including a resistor divider network coupled in parallel with said output, said switching controller circuit sensing a voltage at a node in said resistor divider network that is a function of said output voltage of said converter.

3. The converter as recited in claim 1 wherein said switching controller circuit comprises a flip-flop that provides said complementary control signals to said first and second switches.

4. The converter as recited in claim 1 further comprising an inrush resistor, coupled between said input of said converter and said input capacitor, that limits a charge rate of said input capacitor.

5. The converter as recited in claim 1 wherein said output voltage is maintained at a single DC level.

6. The converter as recited in claim 1 wherein said output voltage is selected from the group consisting of:
   +5 volts, and
   +3.3 volts.

7. The converter as recited in claim 1 wherein said input and output capacitor, said first and second switches and said switching controller circuit are embodied in a monolithic integrated circuit.

8. A method of providing DC power to a load, comprising the steps of:
   coupling an input capacitor to a source of DC power at an input voltage;
   coupling an output capacitor in parallel with said load; and
   driving a first switch coupled in parallel with said input capacitor and a second switch interposed between said input capacitor and said load with complementary control signals as a function of a desired output voltage to provide said DC power.

9. The method as recited in claim 8 further comprising the step of sensing a voltage at a node in a resistor divider network coupled in parallel with said load that is a function of said output voltage of said converter.

10. The method as recited in claim 8 wherein said step of driving comprises the step of providing said complementary control signals to said first and second switches with a flip-flop.

11. The method as recited in claim 8 further comprising the step of limiting a charge rate of said input capacitor with an inrush resistor coupled between said source of DC power and said input capacitor.

12. The method as recited in claim 8 wherein said output voltage is maintained at said desired output voltage.

13. The method as recited in claim 8 wherein said desired output voltage is selected from the group consisting of:
   +5 volts, and
   +3.3 volts.

14. The method as recited in claim 8 wherein said input and output capacitor, said first and second switches and said switching controller circuit are embodied in a monolithic integrated circuit.

15. A computer system, comprising:

a microprocessor load that requires DC power of a first voltage to be provided thereto;

dynamic random access memory (DRAM), coupled to said microprocessor, that requires DC power of a second voltage to be provided thereto;

a central power supply that acts as a central source of DC power for said computer system; and first and second DC/DC power converters, having DC inputs coupled to said central power supply and DC outputs coupled to said microprocessor and DRAM, respectively, that convert a voltage of said DC power provided by said central power supply to said first and second voltages, respectively, each of said first and second DC/DC power converters including:

an input capacitor coupled to said DC input thereof, a first switch coupled between said input capacitor and said DC output thereof to transfer electrical power from said DC input to said DC output when said first switch is closed, an output capacitor coupled in parallel with said DC output, a second switch coupled in parallel with said input capacitor to short said input capacitor when said second switch is closed, and a switching controller circuit, coupled to said first and second switches, that provides complementary control signals to said first and second switches that are a function of an output voltage of said converter.

16. The computer system as recited in claim 15 wherein each of said first and second DC/DC power converters further includes a voltage sensing circuit including a resistor divider network coupled in parallel with said output, said switching controller circuit sensing a voltage at a node in said resistor divider network that is a function of said output voltage of said converter.

17. The computer system as recited in claim 15 wherein said switching controller circuit comprises a flip-flop that provides said complementary control signals to said first and second switches.

18. The computer system as recited in claim 15 wherein each of said first and second DC/DC power converters further includes an inrush resistor, coupled between said input of said converter and said input capacitor, that limits a charge rate of said input capacitor.

19. The computer system as recited in claim 15 wherein said output voltage is selected from the group consisting of:

+5 volts, and

+3.3 volts.

20. The computer system as recited in claim 15 wherein said input and output capacitor, said first and second switches and said switching controller circuit are embodied in a monolithic integrated circuit.

* * * * *